United States Patent [19]

Espenscheid et al.

[11] 4,188,235

[45] Feb. 12, 1980

[54] ELECTRODE BINDER COMPOSITION

[75] Inventors: Wilton F. Espenscheid, Princeton, N.J.; Tsoung-Yuan Yan, Philadelphia, Pa.

[73] Assignee: Mobil Oil Corporation, New York, N.Y.

[21] Appl. No.: 867,558

[22] Filed: Jan. 6, 1978

Related U.S. Application Data

[63] Continuation-in-part of Ser. No. 703,720, Jul. 9, 1976, abandoned.

[51] Int. Cl.$^2$ ............................................. C08L 95/00
[52] U.S. Cl. ................................... 106/278; 106/279; 208/22; 208/23; 208/44; 208/45; 252/502; 429/189; 429/197; 429/217; 429/232
[58] Field of Search ............... 106/278, 279; 208/22, 208/23, 44, 45

[56] References Cited

U.S. PATENT DOCUMENTS

| | | | |
|---|---|---|---|
| 2,340,847 | 2/1944 | Parkes | 106/280 |
| 3,147,205 | 9/1964 | Ohsol et al. | 208/45 |
| 3,303,122 | 2/1967 | Doelman | 106/279 X |
| 3,382,084 | 5/1968 | Folkins et al. | 106/284 |
| 3,725,240 | 4/1973 | Baum | 208/22 X |
| 3,835,024 | 9/1974 | Ueda et al. | 208/22 |
| 3,968,023 | 9/1976 | Yan | 208/312 |
| 4,009,308 | 2/1977 | Tadashi et al. | 208/3 |

*Primary Examiner*—Howard E. Schain
*Attorney, Agent, or Firm*—Charles A. Huggett; Raymond W. Barclay

[57] ABSTRACT

This invention provides a novel asphalt composition suitable for use as a binder for carbon electrodes which consists essentially of a homogeneous blend of three organic materials comprising (1) a highly aromatic hydrocarbon solvent having a specific combination of physical properties and chemical constituency, (2) a benzene-soluble fraction of solvent-refined coal and/or solvent-refined wood, and (3) a benzene-insoluble fraction of solvent-refined coal and/or solvent-refined wood. The novel asphaltic compositions is characterized by low sulfur content and high binding strength, which are desirable properties for application as a carbon electrode binder.

3 Claims, No Drawings

ELECTRODE BINDER COMPOSITION

CROSS-REFERENCE TO RELATED APPLICATION

This application is a continuation-in-part of U.S. Pat. application Ser. No. 703,720, filed July 9, 1976 now abandoned, entitled "ELECTRODE BINDER COMPOSITION," of W. F. Espencheid and T. Y. Yan.

BACKGROUND OF THE INVENTION

In the manufacture of molded carbonaceous materials such as carbon electrodes, calcined coke is generally employed as the starting material. As the coke possesses no natural adhesiveness, it must be bound together with a compatible material. In the manufacture of carbon electrodes, the coke is usually ground, mixed with a binder, molded and then baked to carbonize the binder. Binders employed for these purposes must be sufficiently fluid at the temperatures at which they are mixed with the solid coke in order to completely wet and penetrate the coke. Furthermore, the binder should be relatively stable when subjected to temperatures as high as about 200° C. Because of these stringent requirements, commercially employed pitch binders have been manufactured almost exclusively from selected coal-tar products.

Binders employed in the production of molded carbonaceous articles should generally comprise a stable hydrocarbon mixture of uniform consistency and quality, and should be substantially free from contaminants. Among the contaminants which have prevented the use of petroleum-derived pitch in carbonaceous articles, are coke-like materials. The term "coke" or "coke-like materials" as employed herein denotes a hydrocarbon having a carbon to hydrogen atomic ratio of about 2.0 or higher, and is generally produced as a result of excessive polymerization and condensation reactions, which are necessary for obtaining a pitch binder having the desired properties. A satisfactory pitch binder, suitable for use in the manufacture of carbon electrodes, can hold in stable suspension only about 2.5 weight percent of coke-like materials. At coke concentrations greater than about 2.5 weight percent, it is found that the excess coke-like material tends to agglomerate and to separate from the pitch, producing a non-uniform product and providing a non-uniform binder. This coke-like material has been found to have poor binding properties and does not contribute to the desired characteristics of the finished product. The presence of excess coke in petroleum-derived pitch, therefore, is one of the main factors causing migration during baking treatment of carbon electrodes, and resulting in areas of unbonded carbon in the finished article. In this condition, a carbon electrode employing a petroleum pitch binder, is produced having uneven mechanical strength, and is variable in conductivity. For these reasons, petroleum pitches have not been considered as satisfactory binders, since they fail to meet the stringent requirements of commercially desirable pitch binders. Thus, commercial pitch binders generally have been produced almost exclusively from coal tar. Moreover, in some applications the presence of excessive sulfur in the aforementioned electrodes causes deleterious effects during ore reduction.

One method contemplated by the prior art for preparing a pitch binder from petroleum-derived hydrocarbons involves thermally cracking a high-boiling hydrocarbon fraction, and passing the hot cycle residue into a soaking tank of substantial capacity. The flow of the cycle residue is regulated through the soaking tank, so that the residence time for any given increment of feedstock ranges from about 3 to about 5 hours. The initial pitch thus produced is not considered satisfactory, and is recycled through the soaking tank to improve its quality. However, over an extended soaking time period, an excessive amount of coke-like material is produced in the upgrading of the pitch product, and some of the excess coke separates and tends to accumulate at the bottom of the soaking tank. This condition requires an extensive cleaning operation to remove undesired accumulated coke. In addition, the excess coke thus produced contaminates the pitch product and causes the undesirable characteristics of a non-uniform pitch binder. Furthermore, the extended soaking operation of the prior art, is found to be a time consuming and expensive method for improving the quality of the pitch binder.

U.S. Pat. No. 3,707,388 describes the preparation of an improved asphaltic binder composition by a controlled air-blowing polymerization of a petroleum asphalt having a specific gravity of at least about 1.1 and a benzene-insoluble content of not more than 12 weight percent.

U.S. Pat. No. 3,725,240 describes a method for producing an improved asphaltic binder composition for carbon electrodes, by a multistep procedure which involves (1) conversion of a petroleum refinery cycle stock by thermal treatment to vis-broken cycle stock, (2) fractionation and separation of a heavy fraction from the vis-broken cycle stock, and (3) air-blowing of the heavy fraction under conditions which yield a pitch suitable for use as a binder for electrode coke. U.S. Pat. No. 2,340,847 describes a tar binder which is a pitch residue of coal tar (from which toluene-insoluble fractions have been removed) in combination with a high boiling oil (e.g., creosote).

U.S. Pat. No. 3,147,205 teaches an improved method for upgrading coal tar for application as an electrode binder. The method consists of the rejection of inorganic components and quinoline-insoluble organic components from coal tar by treatment of the coal tar with benzene under conditions of high temperature and pressure.

There remains a need for new and improved petroleum-derived asphalt compositions which have superior properties for use as binders for molded carbonaceous materials. Further, the development of such petroleum-derived asphalt compositions must contend with recent international economic developments which have resulted in a several fold increase in the price of raw petroleum.

Accordingly, it is a main object of the present invention to provide a petroleum-derived asphalt composition which has superior properties for use as a binder in carbon electrodes.

It is another object of the present invention to provide a process for upgrading low value petroleum refinery residual streams into high value asphalt compositions, without a required air-blowing polymerization treatment.

It is another object of the present invention to provide a petroleum asphaltic composition which contains a major proportion of highly aromatic organic components derived from coal and/or wood.

It is a further object of the present invention to provide an asphaltic composition with a pitch-like consistency which has a low sulfur content and exhibits high binding strength suitable for use in the manufacture of carbon electrodes.

Other objects and advantages of the present invention shall become apparent from the accompanying description and examples.

DESCRIPTION OF THE INVENTION

One or more objects of the present invention are accomplished by the provision of an asphalt composition comprising a homogeneous blend of (1) a highly aromatic hydrocarbon solvent having a specific combination of physical properties and chemical constituency, (2) a highly aromatic component selected from benzene-soluble fractions of solvent-refined coal and solvent-refined wood, and (3) a higly aromatic component selected from benzene-insoluble fractions of solvent-refined coal and solvent-refined wood.

HIGHLY AROMATIC HYDROCARBON SOLVENT

By the term "thermally stable" refinery petroleum fractions is meant a highly aromatic residuum such as fluidized catalytic cracking (FCC) "main column" bottoms or thermofor catalytic cracking (TCC) "syntower" bottoms which contain a substantial proportion of polycyclic aromatic hydrocarbon constituents such as naphthalene, dimethylnaphthalene, anthracene, phenanthrene, fluorene, chrysene, pyrene, perylene, diphenyl, benzothiophene, and the like. Such refractory petroleum media are resistant to conversion to lower molecular products by conventional non-hydrogenative procedures. Typically, these petroleum refinery residua and recycle fractions are hydrocarbonaceous mixtures having an average carbon to hydrogen ratio above about 1:1, and a boiling point above about 450° F.

The petroleum solvents suitable for the practice of the present invention process are thermally stable, highly polycyclic aromatic mixtures which result from one or more petroleum refining operations. Representative heavy petroleum solvents include FCC main column bottoms; TCC syntower bottoms; asphaltic material; alkane-deasphalted tar; coker gas oil; heavy cycle oil; FCC main column clarified slurry oil; mixtures thereof, and the like. "FCC main column bottoms" and "TCC syntower bottoms" are obtained as petroleum refinery residual streams from gas oil catalytic cracking operations.

In a FCC operation, preheated gas oil is charged to a reactor inlet line, where it picks up finely divided (e.g., 100 mesh) regenerated catalyst from the regenerator-catalyst standpipe and carries it into the reactor. Sensible heat of the gas oil charge plus sensible heat of hot catalyst from regeneration at temperatures upwards of 1200° F. supply sufficient heat to sustain the endothermic cracking reaction at a desired temperature. The upward flow of hydrocarbons in the FCC reactor is adjusted to maintain a fluidized bed of the finely divided catalyst, thereby promoting contact between catalyst and charge. In a typical operation for preparing a highly aromatic petroleum solvent for this invention, California heavy gas oil (650° F.–1000° F.) is converted over a zeolite catalyst (e.g., as described in U.S. Pat. No. 3,140,249) in an FCC operation at 950°–975° F., a weight hourly space velocity of 11 and a catalyst to oil ratio of 8. Reaction products are then passed into a distillation column, in the bottoms section of which they are quenched to about 600° F. to condense the heaviest hydrocarbons. Quenching is accomplished by circulating heavy condensate through a cooler and then back through the bottoms section of the column. The circulating condensate scrubs catalyst fines out of the up-flowing reaction products. The catalyst slurry so produced is sent to a settler to concentrate the catalyst, and the concentrated catalyst is separated and returned to the reactor. The oil separated from the concentrated bottoms is referred to as "FCC main column bottoms" or "FCC bottoms" or "clarified slurry oil".

In a TCC operation, catalyst pellets of one-sixteenth inch diameter move downwardly through a reactor as a compact bed. In most modern TCC units, flow of gas oil charge is concurrent with catalyst flow in the reactor. As in FCC, heat of endothermic reaction is supplied by sensible heat of gas oil charge and catalyst. After charging wide cut gas oil (400°–1000° F.) from mixed Canadian crudes and employing a catalyst (e.g., as described in U.S. Pat. No. 3,140,249) at 875°–925° F. and a liquid hourly space velocity of 2 and a catalyst-to-oil ratio of 5, the reactor effluent is fractionated to provide a TCC bottoms fraction (i.e., "syntower bottoms") suitable for processing according to this invention.

The nominal properties of various highly aromatic refining petroleum streams are as follows:

| Syntower Bottoms | |
| --- | --- |
| Sulfur | 1.13% |
| Nitrogen | 450 ppm |
| Pour Point | 50° F. |
| 5% Boiling Point | 640° F. |
| 95% Point | 905° F. |
| Conradson Carbon | 9.96 |

| FCC Clarified Slurry Oil | |
| --- | --- |
| Sulfur | 1.04% |
| Nitrogen | 440 ppm |
| Pour Point | 50° F. |
| 5% Boiling Point | 630° F. |
| 95% Point | 924° F. |
| Conradson Carbon | 10.15 |

| Heavy Cycle Oil | |
| --- | --- |
| Sulfur | 1.12% |
| Nitrogen | 420 ppm |
| Initial Boiling Point | 373° F. |
| 95% Point | 752° F. |
| Conradson Carbon | 10.15 |

An FCC bottoms refinery stream is a highly preferred solvent component for the preparation of the present invention asphalt composition. A typical FCC main column bottoms stream (or FCC clarified slurry oil) contains a mixture of chemical constituents as represented in the following mass spectrometric analysis:

| Compounds | Aromatics | Naphthenic/ Aromatics |
| --- | --- | --- |
| Alkyl Benzenes | 0.4 | |
| Naphthene Benzenes | | 1.0 |
| Dinaphthene Benzenes | | 3.7 |
| Naphthalenes | 0.1 | |
| Acenaphthenes, (biphenyls) | | 7.4 |
| Fluorines | | 10.1 |
| Phenanthrenes | 13.1 | |
| Naphthene phenanthrenes | | 11.0 |
| Pyrenes, fluoranthenes | 20.5 | |
| Chrysenes | 10.4 | |
| Benzofluoranthenes | 6.9 | |

-continued

| Compounds | Aromatics | Naphthenic/ Aromatics |
|---|---|---|
| Perylenes | 5.2 | |
| Benzothiophenes | 2.4 | |
| Dibenzothiophenes | 5.4 | |
| Naphthobenzothiopenes | | 2.4 |
| Total | 64.4 | 35.6 |

A typical FCC bottoms stream has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |

Pour Point, °F.: 50

CCR, %: 99.96

| Distillation: | |
|---|---|
| IBP, °F.: | 490 |
| 5%, °F.: | 640 |
| 95%, °F.: | 905 |

FCC main column bottoms are obtained (as noted above) by the catalytic cracking of gas oil in the presence of a solid porous catalyst. A more complete description of the production of this petroleum fraction is disclosed in U.S. Pat. No. 3,725,240.

A FCC main column bottoms is an excellent liquefaction solvent medium for (coal/wood) solubilization because it has a unique combination of physical properties and chemical constituency. A critical aspect of solvating ability is the particular proportions of aromatic and naphthenic and paraffinic moieties characteristic of a prospective liquefaction solvent. A high content of aromatic and naphthenic structures in a solvent is a criterion for high solvating ability for carbohydrate liquefaction.

The ability of a solvent to solvate carbonaceous materials can be expressed in terms of specific types of hydrogen content as determined by proton nuclear magnetic resonance spectral analysis. Nuclear magnetic resonance characterization of heavy hydrocarbon oils is well developed. The spectra (60 µc/sec.) are divided into four bonds ($H_\alpha$, $H_\beta$, $H_\gamma$ and $H_{Ar}$) according to the following frequencies in Hertz (Hz) and chemical shift ($\delta$):

| | $H_\alpha$ | $H_\beta$ | $H_\gamma$ | $H_{Ar}$ |
|---|---|---|---|---|
| Hz | 0–60 | 60–100 | 120–200 | 360–560 |
| $\delta$ | 0–1.0 | 1.0–1.8 | 2.0–3.3 | 6.0–9.2 |

The $H_{Ar}$ protons are attached to aromatic rings and are a measure of aromaticity of a solvent. $H_\alpha$ protons are attached to non-aromatic carbon atoms attached directly to an aromatic ring structure, e.g., alkyl groups and naphthenic ring structures. $H_\beta$ protons are attached to carbon atoms which are in a second position away from an aromatic ring, and $H_\gamma$ protons are attached to carbon atoms which are in a third position or more away from an aromatic ring structure.

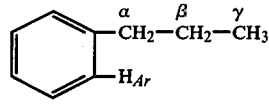

The $H_{Ar}$ protons are important because of their strong solvency power. A high content of $H_\alpha$ protons is particularly significant in a liquefaction solvent, because $H_\alpha$ protons are labile and are potential hydrogen donors in a solvation process. $H_\beta$ and $H_\gamma$ protons are paraffinic in nature and do not contribute to the solvating ability of a liquefaction solvent.

It is particularly preferred that the highly aromatic hydrocarbon solvent component of this invention has a hydrogen content distribution in which the $H_{Ar}$ proton content is between about 30 and 50 percent, the $H_{60}$ proton content is at least about 30 percent and the $H_\alpha/H_\beta$ proton ratio is above about 1.4. Concomitantly it is desirable that the $H_\beta$ proton content is below 20 percent and the $H_\gamma$ proton content is below 13 percent.

It is preferred that the highly aromatic hydrocarbon solvent component of this invention be a highly aromatic refinery petroleum residuum solvent having the above hydrogen content distribution and especially preferred that the highly aromatic refinery petroleum residuum solvent be selected from the group consisting of FCC main column bottoms and TCC syntower bottoms.

Petroleum solvents possessing the desired hydrogen content distribution are obtained as a bottoms fraction from the catalytic cracking or hydrocracking of gas oil stocks in the moving bed or fluidized bed reactor processes. In general depending upon such conditions as temperature, pressure catalyst-to-oil ratio, space velocity and catalyst nature, a high severity cracking process results in a petroleum residuum solvent having an increased content of $H_{Ar}$ and $H_\alpha$ protons and a decreased content of the less desirable $H_\beta$ and $H_\alpha$ protons.

The proton distribution in examples of various highly aromatic hydrocarbon by-product streams are shown below.

| Example | $H_\alpha$ | $H_\beta$ | $H_\gamma$ | $H_{Ar}$ | $H_\alpha/H_\beta$ |
|---|---|---|---|---|---|
| FCC/MCB | | | | | |
| #1 | 36.0 | 19.3 | 12.7 | 32.0 | 1.87 |
| #2 | 36.4 | 13.6 | 5.2 | 44.8 | 2.68 |
| #3 | 18.5 | 50.0 | 14.3 | 17.1 | 0.37 |
| #4 | 18.1 | 48.8 | 18.9 | 14.2 | 0.37 |
| TCC/Syntower Bottoms | | | | | |
| #1 | 29.8 | 20.9 | 7.9 | 41.4 | 1.42 |
| #2 | 16.3 | 48.1 | 20.0 | 15.6 | 0.35 |
| Clarified Slurry Oil | 19.4 | 48.5 | 16.5 | 15.5 | 0.40 |
| Agha Jari Resid (850 + °F.) | 12.0 | 60.0 | 24.0 | 5.0 | 0.20 |
| SRC Recycle Oil | 27.1 | 14.7 | 6.9 | 46.3 | 1.84 |
| Coal Tar | 5. | — | — | 91. | — |

From the foregoing it may be seen that hydrocarbons having the same general process derivation may or may not have the desired proton distribution identified in the foregoing discussion. For example, FCC/MCB #1 and #2 have the desired proton distribution while FCC/MCB #3 and #4 do not.

Furthermore, it is not necessary that the highly aromatic hydrocarbon solvent component of the novel asphalt composition of this invention be derived only from petroleum. In the above table, it may be noted that SRC recycle solvent closely resembles FCC/MCB #1 and #2, particularly in the $H_\alpha/H_\beta$ ratio. The following table, from an article entitled "Recycle Solvent Techniques for the SRC Process," by R. P. Arderson, appearing in *Coal Processing Technology*, Volume 2, Am. Inst. of Chem. Engr., pages 130–32 (1975), shows that some SCR recycle solvents may be suitable for use as the highly aromatic hydrocarbon solvent component of the present invention. Shown in the table are the hydrogen distribution changes which occur during multiple passes of recycle solvent through the coal extraction step of an SCR process. The initial solvent employed was Gulf Carbon Black Feedstock FS 120.

|  | $H_\alpha$ | $H_\beta$ | $H_\gamma$ | $H_{Ar}$ | $H_\alpha/B_\beta$ |
|---|---|---|---|---|---|
| Gulf FS 120 | 29.7 | 31.4 | 9.2 | 29.7 | 0.94 |
| Pass 1 | 30.8 | 30.2 | 8.2 | 30.8 | 1.02 |
| 2 | 31.3 | 28.4 | 7.1 | 33.2 | 1.10 |
| 3 | 29.9 | 26.7 | 7.4 | 36.0 | 1.12 |
| 4 | 30.3 | 24.7 | 6.9 | 38.1 | 1.23 |
| 5 | 30.1 | 23.9 | 6.2 | 39.8 | 1.26 |
| 6 | 28.8 | 22.3 | 7.0 | 41.9 | 1.29 |
| 7 | 28.7 | 21.2 | 6.3 | 43.8 | 1.35 |
| 8 | 29.4 | 20.1 | 5.8 | 44.7 | 1.46 |
| 9 | 29.7 | 19.3 | 4.9 | 46.1 | 1.54 |
| 10 | 30.0 | 18.8 | 4.7 | 46.5 | 1.60 |
| 11 | 29.8 | 18.8 | 4.9 | 46.5 | 1.58 |
| Raw Anthracene Oil | 18.9 | 3.4 | 0.6 | 77.1 | 5.6 |
| Partially Hydrogenated Anthracene Oil | 20.5 | 8.6 | 1.6 | 69.3 | 2.4 |
| Anthracene Oil Recycle | 23.3 | 15.2 | 4.7 | 56.7 | 1.53 |

Although not preferred, recycle solvents such as shown from passes 9–11 of the foregoing table may be employed as the highly aromatic hydrocarbon solvent component of this invention.

SOLVENT REFINED COAL

By the term "solvent-refined" coal is meant any of the purified carbonaceous materials produced by the steps of (1) liquefaction of coal in a highly aromatic or partially hydrogenated aromatic solvent (e.g., tetralin, anthracene, recycle coal oil, and the like); (2) separation of a solvent-rich liquefaction phase from ash and other undissolved solids; (3) distillation of the liquefaction phase to remove the solvent and volatile components of the solution; and (4) recovery of the high boiling distillation residuum as "solvent-refined" coal.

In a typical process, solvent-refined coal is produced by (1) heating a mixture of powdered coal and recycle coal solvent (e.g., a distillation fraction recovered in a coal liquefaction process) at a temperature of about 790° F. under hydrogen pressure of about 1000–2000 psi for a period of about one hour; (2) separating the liquefaction phase from solids by filtration; (3) distilling the liquefaction phase to remove the solvent and volatile components which have a boiling point below about 600° F. at standard pressure; and (4) recovering solvent-refined coal which is substantially free of ash and has a much lower oxygen and sulfur content than in the original coal starting material. The solvent-refined coal is about 50 percent soluble in benzene (insoluble in pentane) and about 50 percent soluble in pyridine (insoluble in benzene). Table A summarizes the physical and chemical characteristics of W. Kentucky and Illinois types of coal, and the solvent-refined coal products derived therefrom in accordance with the hereinabove described liquefaction process.

The type of solvent-refined coal described in Table A contains about 50 percent by weight of asphaltene components. Table B summarizes the results of a chromatographic separation of solvent-refined coal components. The asphaltenes appear to be a mixture of polar hydrocarbons, indoles and benzofuran derivatives, each of which is substituted with phenyl and/or naphthyl groups.

TABLE A

| | W. Kentucky 14 Coal | | | Illinois #6 Coal | | |
|---|---|---|---|---|---|---|
| | Dry | Dry Ash Free | SRC Product | Dry | Dry Ash Free | SRC Product |
| C | 72.98 | 79.0 | 87.6 | 70.22 | 79.4 | 85.3 |
| H | 5.12 | 5.9 | 4.8 | 4.75 | 5.4 | 5.6 |
| N | 1.33 | 1.4 | 2.0 | 1.42 | 1.6 | 1.8 |
| S | 3.06 | 3.3 | 0.8 | 3.22 | 3.6 | 0.9 |
| Ash | 8.48 | — | 0.7 | 11.57 | — | 1.5 |
| O | 9.03 | 9.8 | 3.4 | 8.82 | 9.9 | 4.3 |

Coal $C_{100}N_{89}N_{1.5}S_{1.5}O_9$
SRC $C_{100}N_{66}N_{1.9}S_{0.3}O_{2.9}$
7800 SCF $H_2$/ton coal
8.5 atoms H/100 C Coal $C_{100}H_{89}N_{1.5}S_{1.5}O_9$
SRC $C_{100}H_{78}N_{1.8}S_{0.4}O_{3.8}$
Yield SRC 55 percent

TABLE B

FRACTIONS OBTAINED BY LIQUID CHROMATOGRAPHY ON SILICA GEL OF W. KENTUCKY 14 SOLVENT REFINED COAL

|  | |—Oil-like Compounds—| | |—Multifunctional Compounds[2]—| | | | |
|---|---|---|---|---|---|---|---|---|
|  | | | | |—Asphaltenes[1]—| | | | |
| Fraction | #1 | #2 | #3 | #4 | #5 | #6 | #7 | #8 | #9 |
| Eluent | hexane | hexane 15% benzene | $CHCl_3$ | $CHCl_3$ 4% $Et_2O$ | $Et_2O$ 3% EtOH | MeOH | $CHCl_3$ 3% EtOH | THF 3% EtOH | Pyridine 3% EtOH |
| % in SRC[3] | 0.4 | 15 | 30 | 10.2 | 10.1 | 4.1 | 6.4 | 10.2 | 8.5 |

[1] Asphaltenes defined as benzene-soluble, pentane-insoluble compounds.
[2] Multifunctional products defined as pyridine-soluble, benzene-insoluble compounds.
[3] This analysis totals 94.9%; 5.1% of the SRC was not eluted from the column.

Another method of solvent-refining coal is by liquefaction of coal in the presence of a catalyst and a solvent under high hydrogen pressure at a temperature between about 650° F. and 750° F. Suitable catalysts include those containing metals such as molybdenum, zinc, magnesium, tungsten, iron, nickel, chromium, vanadium, palladium, platinum, and the like. High temperature, sulfur-resistant catalysts such as molybdenum and tungsten sulfide are preferred.

The nominal properties of various types of coals amenable to solvent-refining methods are as follows:

| High Volatile A | |
|---|---|
| Sulfur | 1.33% |
| Nitrogen | 1.63 |
| Oxygen | 7.79 |
| Carbon | 80.88 |
| Hydrogen | 5.33 |
| Ash | 2.77 |
| Sub Bituminous | |
| Sulfur | 0.21% |
| Nitrogen | 0.88 |
| Oxygen | 15.60 |
| Carbon | 65.53 |
| Hydrogen | 5.70 |
| Ash | 3.99 |
| Lignite | |
| Sulfur | 0.53% |
| Nitrogen | 0.74 |
| Oxygen | 32.04 |
| Carbon | 54.38 |
| Hydrogen | 5.42 |
| Ash | 5.78 |

Ball mills or other types of conventional apparatus may be employed for pulverizing coarse coal in the preparation of comminuted feed coal for solvent-refining. The crushing and grinding of the coal can be accomplished either in a dry state or in the presence of liquefaction solvent. The average particle diameter of the feed coal is preferably below about 0.05 inches.

SOLVENT-REFINED WOOD

By the term "wood" is meant fibrous plant material which consists substantially of cellulose and lignin.

By the term "solvent-refined" wood is meant any of the purified carbonaceous materials produced by the steps of (1) liquefaction of wood in a highly aromatic or partially hydrogenated aromatic solvent; (2) separation of a solvent-rich liquefaction phase from ash and other undissolved solids; (3) distillation of the liquefaction phase to remove the solvent and volatile components of the solution; and (4) recovery of the high boiling distillation residuum as "solvent-refined" wood.

Wood can be solubilized with high efficiency by dissolving wood in a highly aromatic solvent at temperatures of about 600° F.–750° F. in the absence of any added reducing gases such as hydrogen or synthesis gas.

Pitch-like compositions which are flowable at room temperatures can be prepared at solvent to wood weight ratios as low as 1:1. Only sufficient pressure to maintain the solvent in the liquid state is required for dissolution of the wood.

Exceptionally high conversions of wood, and absence of carbonaceous residues, would seem to indicate that the wood depolymerizes during pyrolysis. The presence of a highly solvating medium (e.g., FCC main column bottoms) for the low molecular reaction products sharply decreases the rate of crosslinking and stabilizes the reaction products as low molecular weight oils.

Table C discloses the results of liquefaction of various hard woods in FCC main column bottoms, FCC heavy cycle oil, and 850+° F. Agha Jari residuum at solvent to wood ratios varying between 2:1 and 1:1 over a temperature range of 700° F.–750° F. With the exception of Agha Jari residuum, the conversion yields are high.

In the case of the Agha Jari residuum, the low conversion yields are indicative of thermodynamic and kinetic factors such as repolymerization and crosslinking of low molecular weight intermediates, coking and cracking of the Agha Jari residuum, and loss of solvent.

TABLE C

Conversion Of Wood To Oil In Aromatic Petroleum Fractions

| Run | Wood-Type | Temperature °F. | Time hr. | Oil | Oil/Wood wt/wt | Conversion[1] |
|---|---|---|---|---|---|---|
| 1 | Pin Oak, dust | 750 | 1 | Syntower Bottoms | 2 | 89) repeat 95) extractions |
| 2 | Pin Oak, dust | 750 | 1 | Heavy Cycle Oil | 1 | 72 |
| 3 | White Oak, dust | 725 | 1 | Heavy Cycle Oil, 850 + +F. | 1 | 90 |
| 4 | Sawdust | 750 | 1 | Heavy Cycle Oil | 1.5 | 97 |
| 5 | Sawdust | 750 | 1 | Agha Jari, 850 + °F. | 1.5 | 52 |
| 6 | Sawdust | 700 | 3 | Agha Jari, 850 + °F. | 1.5 | −10 |
| 7 | Pine/Fir, sawdust | 750 | 0.5 | FCC Main Column Bottoms | 1.5 | 100 |
| 8 | Pine/Fir, sawdust | 600 | 0.75 | FCC Main Column Bottoms | 1.5 | 100 |
| 9 | Pine/Fir, sawdust | 600 | 1 | FCC Main Column Bottoms | 1.5 | 99 |

[1] Pyridine soluble portion, moisture-ash-free (MAF) basis, includes conversion to gaseous products.

Table D discloses the results of liquefaction of comminuted soft wood in FCC main column bottoms under different processing conditions. The fourth column in Table D reports the results obtained by the Bureau of Mines for the liquefaction of wood in tetralin under high hydrogen pressure. Table D lists the yields of benzene-soluble and benzene-insoluble fractions obtained from the wood, and lists the percentage of wood converted into water, gas and carbon (i.e., unreacted wood).

As a processing procedure in each of Runs A–C, pine/fir sawdust (60 grams) containing 12.8 grams of moisture is charged to a 300 milliliter stirred autoclave which contains FCC bottoms (90 grams) as a solvent medium. The reactor is sealed and brought to reaction temperature in about 45 minutes, and maintained at the reaction temperature for the desired reaction period before cooling to room temperature.

The gases are vented at 77° F. through a weighed drying tube to a gas collection bomb. The gases are analyzed by vapor phase chromatography or mass spectrometry.

TABLE D

Yields and Compositions of Wood Products From Liquefaction with FCC Bottoms

| Run | A | B | C | Bureau of Mines(5) |
|---|---|---|---|---|
| Operation Conditions | | | | |
| Temp., °F. | 750 | 600 | 600 | 770 |
| Time, hr. | ½ | ¾ | 1 | 3 |
| Initial Press., psig. | 0 | 0 | 0 | 1800 |
| Conversion, wt. %(1) | 100 | 100 | 99 | 100 |
| Product Yield, wt. %(1) | | | | |
| Liquid Product | 53.9 | 58.6 | 64 | 50 |
| Benzene Soluble | 8.5 | 28.0 | 12.9 | — |
| Benzene Insoluble(2) | 45.4 | 30.6 | 51.1 | — |
| Gas | 18.9 | 19.8 | 15.2 | 18 |
| Water | 26.2 | 22.5 | 20.8 | 32 |
| Unreacted Wood + Carbon | nil | nil | 0.7 | — |
| Product Quality | | | | |
| Benzene Soluble(3) | | | | |
| %C | —(6) | 76.7 | —(6) | — |
| %H | — | 4.8 | — | — |
| %O | — | 18.5 | — | — |
| Benzene Insoluble | | | | |
| %C | 85.01 | 82.17 | 79.05 | — |
| %H | 4.71 | 5.17 | 5.06 | — |
| %O | 8.02 | 10.51 | 12.94 | — |
| Oxygen Distribution(4) | | | | |
| $CO_x$ | 26.4 | 27.3 | 25.5 | — |
| $H_2O$ | 54.5 | 50.5 | 45.3 | — |
| Liquid Product | 25.5 | 22.7 | 29.2 | — |
| Hydrogen Distribution(4) | | | | |
| Liquid Product | 33.0 | 45.6 | 56.8 | — |
| Gas | 3.3 | 3.7 | 1.2 | — |
| $H_2O$ | 63.7 | 54.4 | 42.0 | — |

(1)Wt. % MAF Wood
(2)Benzene Insoluble, pyridine soluble
(3)Solvent Free Basis
(4)Wt. % of initial hydrogen and oxygen in the wood
(5)Bureau of Mines Technical Paper # 646, Pt III, 1942
(6)Not analyzed

PREPARATION OF ASPHALT COMPOSITIONS

An asphalt composition of the present invention can readily be prepared by admixing together the three major components described hereinabove, and heating the admixture until a homogeneous pitch-like blend is obtained.

In one of its preferred embodiments, the present invention provides a process for producing a low sulfur, high strength asphaltic binder suitable for carbon electrodes which comprises forming an admixture of (1) between about 30–45 weight percent of a highly aromatic petroleum solvent component having the hydrogen content distribution described above and selected from FCC main column bottoms and TCC syntower bottoms, (2) between about 20–35 weight percent of a highly aromatic component selected from benzene-soluble fractions of solvent-refined coal and solvent-refined wood, and (3) between about 20–40 weight percent of a highly aromatic component selected from benzene-insoluble fractions of solvent-refined coal and solvent-refined wood, and heating said admixture at a temperature between about 200° C. and 600° C. for a period of time sufficient to provide a homogeneous pitch-like composition.

A "benzene-soluble" fraction of solvent-refined coal or solvent-refined wood is one which corresponds, for example, to the fraction which dissolves when 50 grams of solvent-refined coal and/or wood are stirred in 100 milliliters of benzene at room temperature until phase equilibrium between dissolved and undissolved material is achieved. A "benzene-insoluble" fraction of solvent-refined coal or wood is one which corresponds to the fraction which remains undissolved under the conditions described above.

A particularly preferred asphalt composition of the present invention is one which has a sulfur content below about 0.3 weight percent, and which consists substantially of organic derivatives having a boiling point in the range between about 450° F. and 1200° F., and most preferably in the range between about 600° F. and 1200° F.

Although it is not required, an asphalt composition of the present invention can be subjected to air-blowing conditions to modify the chemical and physical properties of the composition in a desired manner. As described in U.S. Pat. No. 3,725,240 the blowing treatment can be conducted in the presence of air at a rate of from about 6 to about 30 standard cubic feet per minute per barrel, and preferably from about 10 to about 20 standard cubic feet per minute per barrel. The blowing can be conducted at a temperature between about 700° F. and 850° F., and a pressure between about 0 and 15 psig. A blowing treatment period not exceeding one hour is preferred, so as not to cause formation of coke which is deleterious in asphaltic compositions intended for application as electrode binders.

An asphalt composition of the present invention is evaluated by conventional industry methods. Functional tests are employed to determine pitch handling qualities and potential electrode characteristics. The compositional content of an asphalt composition is determined by physical analytical procedures such as gradient elution chromatography and nuclear magnetic resonance. Satisfactory quality standards for electrode binders are characterized as follows:

| | | |
|---|---|---|
| Softening point, °F. | 230 | |
| Specific gravity (77°/77°)[1] | 1.235 | (min.) |
| Viscosity, cs. at 350° F.[1] | 650 | (max.) |
| Quinoline insolubles, percent wt. | 4 | (max.) |
| Coke/binder equilibrium ratio, gms. coke/cc binder | 1.5 | (min.) |
| Relative crystallinity, percent | 75 | (min.) |
| Heat Hardening Test, 5 hrs. 485° F.: | | |
| Loss. Wt. percent | 4 | (max.) |
| Softening point increase °F. | 20 | (max.) |
| Coke and sludge | Moderate | |
| Nuclear magnetic resonance: | | |
| Analysis, percent H on aromatic rings | 50 | (min.) |
| $CH_3$ gamma to arom. ring | 2 | (max.) |
| At 230° F. soft point | | |

The present invention facilitates the production of a satisfactory carbon electrode binder pitch of 230° F. soft point, in which the pitch possesses a specific gravity in excess of 1.2; from 2 to 2% methyl groups (NMR); a coke/binder equilibrium of 1.5 minimum; a satisfactory heat-hardening test in which the weight loss is 4% maximum; the soft point increase is 20° F. maximum and the quantity of coke laydown is only slight or moderate;

8% maximum weight distillation at 850° F.; and a specific gravity-viscosity relationship, in which the binder exhibits both a relatively high specific gravity and a relatively low specific viscosity. Insofar as the Bureau of Mines Correlation Index (BMCI) is concerned, feed stocks having a relatively high index e.g., about 120 or higher, are particularly desirable.

The following Examples are further illustrative of the present invention. The composition components and other specific ingredients are presented as being typical, and various modifications can be derived in view of the foregoing disclosure within the scope of the invention.

EXAMPLE I

High-volatile A bituminous coal (200 grams) and FCC main column bottoms (300 grams) were charged to a one-liter stirred autoclave. The system was flushed with nitrogen, and then the reaction mixture was heated at 750° F. for one hour. The reactor was quenched, and 6.15 liters of gas were vented at room temperature.

The tacky fluid product was solvent-extracted and divided into (1) a benzene-soluble and hexane-soluble fraction; (2) a benzene-soluble and hexane-insoluble fraction; and (3) a benzene-insoluble and pyridine-soluble fraction. Elemental analysis and NMR indicated that (1) consisted of FCC main column bottoms; (2) was benzene-soluble liquefied coal; and (3) was benzene-insoluble liquefied coal.

The following blend was prepared:

| | |
|---|---|
| FCC main column bottoms | 50 weight percent |
| Benzene-soluble fraction (2) | 32 weight percent |
| Benzene-insoluble fraction (3) | 23 weight percent |

The asphalt composition so produced had the following properties:

| | |
|---|---|
| Softening Point (Ring and Ball) | 227° F. |
| Viscosity (350° F.), CS | 830 |
| Conradson Carbon, % | 40.12 |

EXAMPLE II

In the manner of Example I, solvent-refined coal was fractionated and blended with a 750+° F. cut of FCC main column bottoms:

| | |
|---|---|
| Main column bottoms | 39.6 weight percent |
| Benzene-soluble | 40.1 weight percent |
| Benzene-insoluble | 20.3 weight percent |

The asphalt composition had the following properties:

| | |
|---|---|
| Softening point (Ring and Ball) | 220° F. |
| Viscosity (350° F.), CS | 650* |
| Conradson Carbon, % | 42* |

*(Estimated)

As a further embodiment of this invention, improved asphalt compositions are obtained by incorporating phosphorus or boron compounds into the asphalt compositions. Hence, to a molten asphalt composition as described herein is added one or more phosphorus or boron compounds such as phosphorus pentoxide, aluminum phosphate, boric acid, and the like. The quantity of phosphorus (P) added can vary in the range between about 0.1 and 5 weight percent, based on the total weight of asphalt compositions. The quantity of boron (B) added can vary in the range between about 0.03 and 1.7 weight percent. It is highly preferred that the phosphorus or boron additive does not include any metals except aluminum.

A present invention asphalt composition containing a phosphorus or boron additive has additional advantages for applications as a carbon electrode binder in comparison with electrode binders not containing such additives. For example, an asphalt composition containing phosphorus pentoxide when employed as an electrode binder (1) exhibits less thermal cracking and increases the carbon retained in the electrode as coke, (2) forms a stronger electrode and reduces the amount of gas evolution, and (3) reduces the rate of consumption of the electrode in electrolysis processes.

What is claimed is:

1. A binder composition suitable for carbon electrodes which consists essentially of a homogeneous blend of (1) between about 30–45 weight percent of a highly aromatic hydrocarbon solvent component having a boiling point between about 450° F. to 1200° F. and having a hydrogen content distribution in which the $H_{Ar}$ proton content is between about 30 and 50 percent, the $H_\alpha$ proton content is at least 30 percent and the $H_\alpha/H_\beta$ proton ratio is above about 1.4; (2) between about 20–35 weight percent of a highly aromatic component selected from benzene-soluble fractions of solvent-refined coal and solvent-refined wood; and (3) between about 20–40 weight percent of a highly aromatic component selected from benzene-insoluble fractions of solvent-refined coal and solvent-refined wood, wherein the binder composition has a 230° F. soft point and a specific gravity in excess of 1.2.

2. The binder composition of claim 1 wherein said highly aromatic hydrocarbon solvent component is petroleum residuum solvent.

3. The binder composition of claim 2 wherein the petroleum residuum solvent is selected from the group consisting of FCC main column bottoms and TCC syn-tower bottoms.

* * * * *

UNITED STATES PATENT AND TRADEMARK OFFICE
CERTIFICATE OF CORRECTION

PATENT NO. : 4,188,235
DATED : 2-12-80
INVENTOR(S) : W. F. Espenscheid and T. Y. Yan It is certified that error appears in the above—identified patent and that said Letters Patent are hereby corrected as shown below:

Col. 6, line 19, "$H_{60}$" should read -- Ha --

Col. 10, line 40, "+F." should read -- °F. --

*Signed and Sealed this*

*Twenty-fourth* Day of *June 1980*

[SEAL]

Attest:

SIDNEY A. DIAMOND

*Attesting Officer*   *Commissioner of Patents and Trademarks*